US011204449B2

(12) United States Patent
Teraoka et al.

(10) Patent No.: US 11,204,449 B2
(45) Date of Patent: Dec. 21, 2021

(54) WIDE-ANGLE LENS

(71) Applicant: AAC Optics Solutions Pte. Ltd., Singapore (SG)

(72) Inventors: Hiroyuki Teraoka, Shenzhen (CN); Lei Zhang, Shenzhen (CN); Yanmei Wang, Shenzhen (CN); Yi Ji, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 173 days.

(21) Appl. No.: 16/681,857

(22) Filed: Nov. 13, 2019

(65) Prior Publication Data

US 2020/0241175 A1 Jul. 30, 2020

(30) Foreign Application Priority Data

Jan. 29, 2019 (CN) ......................... 201910084821.0

(51) Int. Cl.
*G02B 3/00* (2006.01)
*G02B 9/62* (2006.01)

(52) U.S. Cl.
CPC ............. *G02B 3/0062* (2013.01); *G02B 9/62* (2013.01)

(58) Field of Classification Search
CPC ..... G02B 9/62; G02B 13/001; G02B 13/0045
See application file for complete search history.

(56) References Cited

U.S. PATENT DOCUMENTS 8,786,961 B2 * 7/2014 Sano ........................ G02B 9/62 359/713
10,254,510 B2 * 4/2019 Dai ........................ G02B 13/18
2018/0129020 A1 * 5/2018 Teraoka ................... G02B 9/62

FOREIGN PATENT DOCUMENTS

| | | | |
|---|---|---|---|
| CN | 108254854 | A1 | 7/2018 |
| CN | 108873262 | A1 | 11/2018 |
| JP | 1980036863 | A1 | 3/1980 |
| JP | 2009251210 | A1 | 10/2009 |
| WO | 2009104669 | A1 | 8/2009 |

OTHER PUBLICATIONS

1st Office Action dated Mar. 18, 2019 by SIPO in related Chinese Patent Application No. 201910084821.0 (5 Pages).
2st Office Action dated Apr. 11, 2019 by SIPO in related Chinese Patent Application No. 201910084821.0 (6 Pages).
1st Office Action dated Aug. 4, 2020 by JPO in related Japanese Patent Application No. 2019-150285 (6 Pages).
2st Office Action dated Nov. 17, 2020 by JPO in related Japanese Patent Application No. 2019-150285 (4 Pages).

* cited by examiner

*Primary Examiner* — Alicia M Harrington
(74) *Attorney, Agent, or Firm* — W&G Law Group

(57) ABSTRACT

The present disclosure relates to the field of optical lenses and provides a wide-angle lens. The wide-angle lens includes, from an object side to an image side: a first lens having a positive refractive power, a second lens having a negative refractive power, a third lens having a negative refractive power, a fourth lens, a fifth lens and a sixth lens. The wide-angle lens satisfies following conditions: $10.00 \leq R5/d5 \leq 30.00$; $15.00 \leq R9/d9 \leq 50.00$; $-20.00 \leq (R1+R2)/(R1-R2) \leq -1.00$; and $2.75 \leq d1/d3 \leq 5.00$. The wide-angle lens can achieve a high imaging performance while obtaining a low TTL.

8 Claims, 7 Drawing Sheets

10
S1
L1
L2
L3
L4
L5
L6
GF
Si

WIDE-ANGLE LENS

TECHNICAL FIELD

The present disclosure relates to the field of camera lens, and more particularly, to a ultra-thin wide-angle lens which is suitable for use in a modular camera for a mobile phone, a WEB camera or the like using a camera element such as a high-pixel Charge Coupled Device (CCD) or Complementary Metal-Oxide Semiconductor (CMOS), has good optical properties, a TTL (a total optical length from an object side surface of a first lens to an image plane of the wide-angle lens along the optic axis)/IH (image height)$\leq$1.50 and an F number (hereinafter, referred to as FNO) of 2.00 or less, and consists of six lenses.

BACKGROUND

In recent years, various types of imaging devices using imaging elements such as CCD and CMOS have been widely used. With the development of miniaturization and high performance of these imaging elements, society demands for a camera lens that has excellent optical characteristics, is ultra-thin, and has a bright FNO.

The development of technology related to a camera lens, which is composed of six lenses, has excellent optical characteristics, is ultra-thin, and has bright FNO, is progressing step by step. A proposed solution is that a wide-angle lens is composed of six lenses: from an object side, a first lens having a positive refractive power, a second lens having a negative refractive power, a third lens having a negative refractive power, a fourth lens, a fifth lens and a sixth lens.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
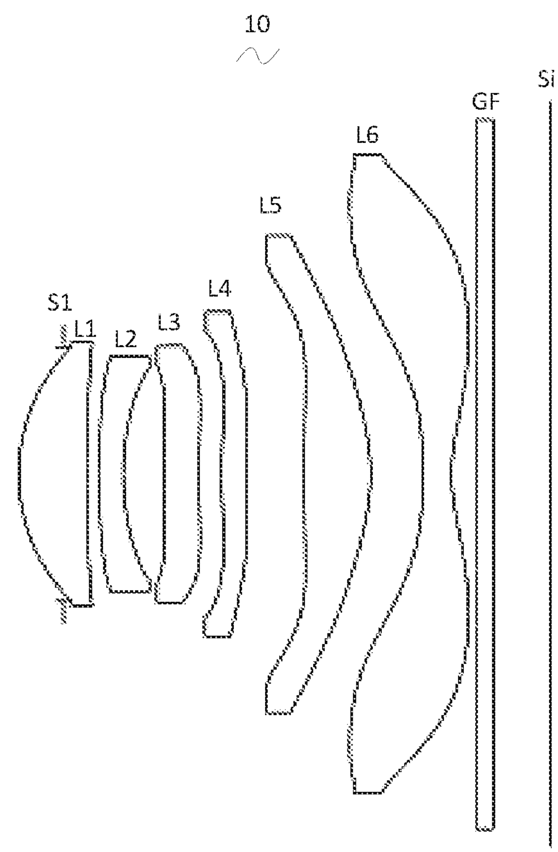
FIG. 1 is a schematic diagram of a structure of a wide-angle lens in accordance with Embodiment 1 of the present disclosure.

Referring to FIG. 1, the present disclosure provides a wide-angle lens 10. FIG. 1 shows the wide-angle lens 10 according to Embodiment 1 of the present disclosure. The wide-angle lens 10 includes 6 lenses. Specifically, the wide-angle lens 10 includes, from an object side to an image side, an aperture S1, a first lens L1, a second lens L2, a third lens L3, a fourth lens L4, a fifth lens L5 and a sixth lens L6. An optical element such as an optical filter GF can be arranged between the sixth lens L6 and an image plane Si.

The first lens L1, the second lens L2, the third lens L3, the fourth lens L4, the fifth lens L5 and the sixth lens L6 are all made of a plastic material.

The first lens L1 has a positive refractive power. The second lens L2 has a negative refractive power, and the third lens L3 has a negative refractive power.

Here, an on-axis curvature radius of an object side surface of the third lens L3 is defined as R5, an on-axis thickness of the third lens L3 is defined as d5. The wide-angle lens 10 should satisfy a condition of $10.00 \leq R5/d5 \leq 30.00$, which specifies a shape of the third lens L3. Out of this range, it is difficult to achieve miniaturization in an FNO bright state.

An on-axis curvature radius of an object side surface of the fifth lens L5 is defined as R9, and an on-axis thickness of the fifth lens L5 is defined as d9. The wide-angle lens 10 should satisfy a condition of $15.00 \leq R9/d9 \leq 50.00$, which specifies a shape of the fifth lens L5. Out of this range, a development towards ultra-thin and wide-angle lenses would make it difficult to correct a problem of an aberration.

An on-axis curvature radius of an object side surface of the first lens L1 is defined as R1, and an on-axis curvature radius of an image side surface of the first lens L1 is defined as R2. The wide-angle lens 10 should satisfy a condition of $-20.00 \leq (R1+R2)/(R1-R2) \leq -1.00$, which specifies a shape of the first lens L1. The ratio is reasonably controlled in such a manner that the wide-angle lens 10 can effectively correct a system aberration. Out of this range, it is difficult to achieve an excellent imaging performance in the FNO bright state. Preferably, $-5.00 \leq (R1+R2)/(R1-R2) \leq -1.00$.

An on-axis thickness of the first lens L1 is defined as d1, and an on-axis thickness of the second lens L2 is defined as d3. The wide-angle lens 10 should satisfy a condition of $2.75 \leq d1/d3 \leq -5.00$, which specifies a ratio of a central thickness of the first lens L1 and a central thickness of the second lens L2. Out of this range, it is difficult to achieve miniaturization in an FNO bright state.

When the on-axis thickness and the curvature radius of the wide-angle lens 10 of the present disclosure satisfy the above conditions, the wide-angle lens 10 will have the advantage of high performance and satisfy the design requirement of wide angle and low TTL. Specifically, a focal length of the wide-angle lens 10 is 5.543 mm, and the wide-angle lens 10 has a total optical length TTL of 6.5 mm, a back focal length LB of 1.201 mm, a FOV (field of view) of 78.048°, and an FNO of 1.780.

In the present embodiment, an object side surface of the first lens L1 is convex in a paraxial region, and an image side surface of the first lens L1 is concave in the paraxial region. The first lens L1 has a positive refractive power, and its focal length f1 is 4.215 mm.

The wide-angle lens 10 should satisfy a condition of $0.50 \leq f1/f \leq 2.00$, which specifies a ratio of the focal length f1 of the first lens L1 and the focal length f of the wide-angle lens 10. By controlling the positive refractive power of the first lens L1 within the reasonable range, miniaturization of the wide-angle lens is achieved. Preferably, $0.50 \leq f1/f \leq 1.00$.

An object side surface of the second lens L2 is convex in the paraxial region, and an image side surface of the second lens L2 is concave in the paraxial region. The second lens L2 has a negative refractive power, and its focal length f2 is −7.176 mm.

An on-axis curvature radius of the object side surface of the second lens L2 is defined as R3, and an on-axis curvature radius of the image side surface of the second lens L2 is defined as R4. The wide-angle lens 10 should satisfy a condition of $1.00 \leq (R3+R4)/(R3-R4) \leq 5.00$, which specifies a shape of the second lens L2. Out of this range, it is difficult to achieve miniaturization in the FNO bright state. Preferably, $1.00 \leq (R3+R4)/(R3-R4) \leq 3.00$.

An object side surface of the third lens L3 is convex in the paraxial region, and an image side surface of the third lens L3 is concave in the paraxial region. The third lens L3 has a negative refractive power, and its focal length f3 is −52.379 mm.

An object side surface of the fourth lens L4 is convex in the paraxial region, and an image side surface of the fourth lens L4 is concave in the paraxial region. The fourth lens L4 has a positive refractive power, and its focal length f4 is 23.353 mm.

An on-axis curvature radius of the object side surface of the fourth lens L4 is defined as R7, and an on-axis curvature radius of the image side surface of the fourth lens L4 is defined as R8. The wide-angle lens 10 should satisfy a condition of $-20.00 \leq (R7+R8)/(R7-R8) \leq -1.00$, which specifies a shape of the fourth lens L4. Out of this range, it is difficult to correct the system aberration in the FNO bright state. Preferably, $-18.00 \leq (R7+R8)/(R7-R8) \leq -3.00$.

The object side surface of the fifth lens L5 is convex in the paraxial region, and an image side surface of the fifth lens L5 is convex in the paraxial region. The fifth lens L5 has a positive refractive power, and its focal length f5 is 4.023 mm.

An object side surface of the sixth lens L6 is concave in the paraxial region, and an image side surface of the sixth lens L6 is concave in the paraxial region. The sixth lens L6 has a negative refractive power, and its focal length f6 is −2.929 mm.

A perpendicular distance Yc62 from an arrest point on the image side surface of the sixth lens L6 to an optic axis is 1.715 mm, and the total optical length TTL of the wide-angle lens 10 is 6.5 mm. The wide-angle lens 10 should satisfy a condition of $0.10 \leq Yc62/TTL \leq 0.55$, which specifies a ratio of a position of the arrest point of the sixth lens L6 and the total optical length. Out of this range, it is difficult to correct the aberration and distortion of the wide-angle lens 10.

The FNO of the wide-angle lens 10 is smaller than or equal to 2.00. The FNO is an F number of the wide-angle lens. When this condition is satisfied, the wide-angle lens 10 will have a good brightness, so as to satisfy the demand for a large aperture and also make night imaging effect better.

With such design, the total optical length TTL of the wide-angle lens 10 can be made as short as possible, and thus the characteristics of wide-angle and miniaturization can be maintained while satisfying the demand for a large aperture.

In the following, examples will be used to describe the wide-angle lens 10 of the present disclosure. The symbols recorded in each example will be described as follows. The focal length, on-axis distance, curvature radius, on-axis thickness, inflexion point position, and arrest point position are all in units of mm. The FOV (field of view) is in a unit of °.

f: focal length of the wide-angle lens 10;

f1: focal length of the first lens L1;

f2: focal length of the second lens L2;

f3: focal length of the third lens L3;

f4: focal length of the fourth lens L4;

FNO: F number;

2ω: FOV (field of view);

S1: aperture;

R: curvature radius of an optical surface, a central curvature radius for a lens;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of the object side surface of the fifth lens L5;

R10: curvature radius of the image side surface of the fifth lens L5;

R11: curvature radius of the object side surface of the sixth lens L6;

R12: curvature radius of the image side surface of the sixth lens L6;

R13: curvature radius of an object side surface of the optical filter GF;

R14: curvature radius of an image side surface of the optical filter GF;

d: on-axis thickness of a lens and an on-axis distance between lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis distance from the image side surface of the fifth lens L5 to the object side surface of the sixth lens L6;

d11: on-axis thickness of the sixth lens L6;

d12: on-axis distance from the image side surface of the sixth lens L6 to the object side surface of the optical filter GF;

d13: on-axis thickness of the optical filter GF;

d14: on-axis distance from the image side surface of the optical filter GF to the image plane;

nd: refractive index of d line;

nd1: refractive index of d line of the first lens L1;

nd2: refractive index of d line of the second lens L2;

nd3: refractive index of d line of the third lens L3;

nd4: refractive index of d line of the fourth lens L4;

nd5: refractive index of d line of the fifth lens L5;

nd6: refractive index of d line of the sixth lens L6;

ndg: refractive index of d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

vg: abbe number of the optical filter GF.

TTL: Optical length (the total optical length from the object side surface of the first lens to the image plane of the wide-angle lens along the optic axis) in mm.

LB: The on-axis distance from the image side surface of the sixth lens L6 to the image plane (including the thickness of the optical filter GF);

IH: Image Height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (1)$$

Here, k is a conic coefficient, A4, A6, A8, A10, A12, A14, A16, A18, A20 are aspherical surface coefficients, x is a perpendicular distance between a point on an aspheric surface curve and the optic axis, and y is an aspherical surface depth (a perpendicular distance between the point on an aspherical surface having a distance of x from the optic axis and a tangent plane tangent to an apex on the aspherical surface optic axis).

For convenience, the aspheric surface of each lens surface uses the aspheric surfaces shown in the above formula (1). However, the present disclosure is not limited to the aspherical polynomials form shown in the formula (1).

Preferably, inflexion points and/or arrest points can be arranged on the object side surface and/or image side surface of the lens, so as to satisfy the demand for the high quality imaging. The description below can be referred to for specific implementations.

Design data of the wide-angle lens 10 in Embodiment 1 of the present disclosure is shown in Tables 1 and 2.

TABLE 1

| | R | d | | nd | | νd | |
|---|---|---|---|---|---|---|---|
| S1 | ∞ | d0 = | −0.550 | | | | |
| R1 | 2.216 | d1 = | 0.841 | nd1 | 1.5439 | ν1 | 55.95 |
| R2 | 57.633 | d2 = | 0.139 | | | | |
| R3 | 9.696 | d3 = | 0.300 | nd2 | 1.6713 | ν2 | 19.24 |
| R4 | 3.179 | d4 = | 0.502 | | | | |
| R5 | 12.424 | d5 = | 0.421 | nd3 | 1.5835 | ν3 | 28.00 |
| R6 | 8.723 | d6 = | 0.280 | | | | |
| R7 | 6.200 | d7 = | 0.301 | nd4 | 1.6150 | ν4 | 25.92 |
| R8 | 10.709 | d8 = | 0.709 | | | | |
| R9 | 38.564 | d9 = | 0.817 | nd5 | 1.5439 | ν5 | 55.95 |
| R10 | −2.303 | d10 = | 0.639 | | | | |
| R11 | −6.529 | d11 = | 0.350 | nd6 | 1.5352 | ν6 | 56.12 |
| R12 | 2.101 | d12 = | 0.300 | | | | |
| R13 | ∞ | d13 = | 0.210 | ndg | 1.5168 | νg | 64.17 |
| R14 | ∞ | d14 = | 0.691 | | | | |

Table 2 shows aspherical surface data of each lens in the wide-angle lens 10 in Embodiment 1 of the present disclosure.

TABLE 2

| | conic coefficient | Aspherical surface coefficients | | | | |
|---|---|---|---|---|---|---|
| | k | A4 | A6 | A8 | A10 | A12 |
| R1 | −1.1312E−02 | 4.2375E−04 | 1.4630E−03 | −2.0733E−03 | 1.8890E−03 | −9.1014E−04 |
| R2 | 0.0000E+00 | 1.3123E−03 | 7.8365E−03 | −6.3708E−03 | 2.7066E−03 | −7.8398E−04 |
| R3 | 3.0576E+01 | −2.0462E−02 | 3.1549E−02 | −2.8741E−02 | 1.9628E−02 | −9.2053E−03 |
| R4 | 7.1003E−01 | −1.9588E−02 | 3.0137E−02 | −2.0729E−02 | 1.2497E−02 | −4.1803E−03 |
| R5 | 0.0000E+00 | −4.6786E−02 | 2.4368E−02 | −5.3859E−02 | 6.8969E−02 | −6.2032E−02 |
| R6 | −5.1351E+01 | −4.8783E−02 | 2.1690E−02 | −1.8240E−02 | 5.1167E−03 | 7.4972E−05 |
| R7 | −1.0648E+01 | −6.5256E−02 | 1.2772E−02 | −1.0721E−03 | 2.2219E−03 | −2.1872E−03 |
| R8 | 1.8820E+01 | −5.5661E−02 | −2.4510E−03 | 8.1552E−03 | −3.0460E−03 | 9.2616E−04 |
| R9 | 0.0000E+00 | 1.2384E−02 | −1.5699E−02 | 7.9616E−03 | −4.2191E−03 | 1.5020E−03 |
| R10 | −6.5543E+00 | 1.5787E−02 | −1.2561E−02 | 8.3130E−03 | −4.0858E−03 | 1.1962E−03 |
| R11 | −1.7242E−01 | −5.3902E−02 | 1.7472E−02 | −3.5823E−03 | 6.5292E−04 | −9.1114E−05 |
| R12 | −8.9629E+00 | −4.6046E−02 | 1.5169E−02 | −3.7013E−03 | 6.1717E−04 | −6.9285E−05 |

| | Aspherical surface coefficients | | | |
|---|---|---|---|---|
| | A14 | A16 | A18 | A20 |
| R1 | 2.0045E−04 | −1.5683E−05 | 0.0000E+00 | 0.0000E+00 |
| R2 | 1.9581E−04 | −2.7302E−05 | 0.0000E+00 | 0.0000E+00 |
| R3 | 2.7185E−03 | −3.6405E−04 | 0.0000E+00 | 0.0000E+00 |
| R4 | 7.6776E−04 | 5.3520E−05 | 0.0000E+00 | 0.0000E+00 |
| R5 | 3.4845E−02 | −1.1196E−02 | 1.5903E−03 | 0.0000E+00 |

TABLE 2-continued

| | | | | |
|---|---|---|---|---|
| R6 | −6.6636E−04 | 1.6444E−04 | 0.0000E+00 | 0.0000E+00 |
| R7 | 7.0264E−04 | −8.1894E−05 | 0.0000E+00 | 0.0000E+00 |
| R8 | −2.1174E−04 | 2.0094E−05 | 0.0000E+00 | 0.0000E+00 |
| R9 | −3.2375E−04 | 4.1204E−05 | −2.8391E−06 | 8.1308E−08 |
| R10 | −2.0571E−04 | 2.0608E−05 | −1.1187E−06 | 2.5527E−08 |
| R11 | 8.4183E−06 | −4.7740E−07 | 1.5065E−08 | −2.0285E−10 |
| R12 | 5.0274E−06 | −2.2087E−07 | 5.1867E−09 | −4.7166E−11 |

Figure 2:
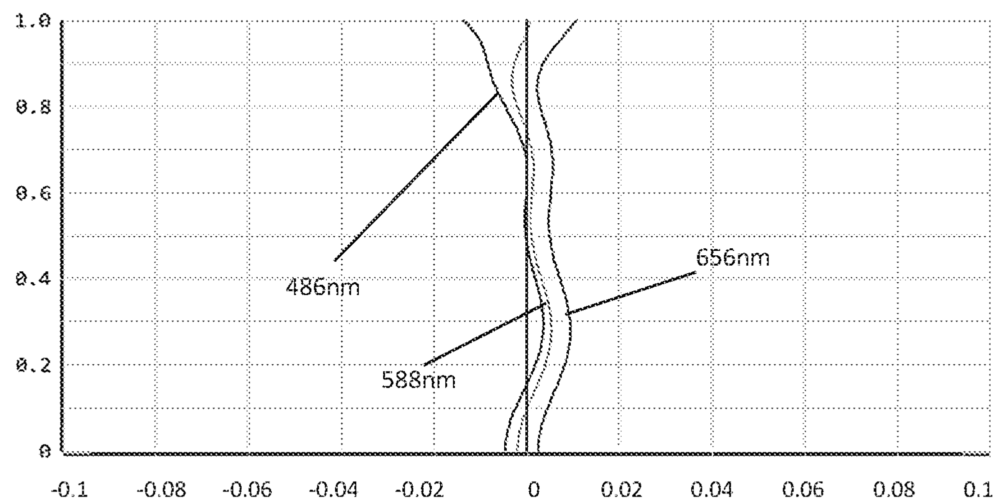
FIG. 2 is a schematic diagram of a longitudinal aberration of the wide-angle lens shown in FIG. 1.
Figure 3:
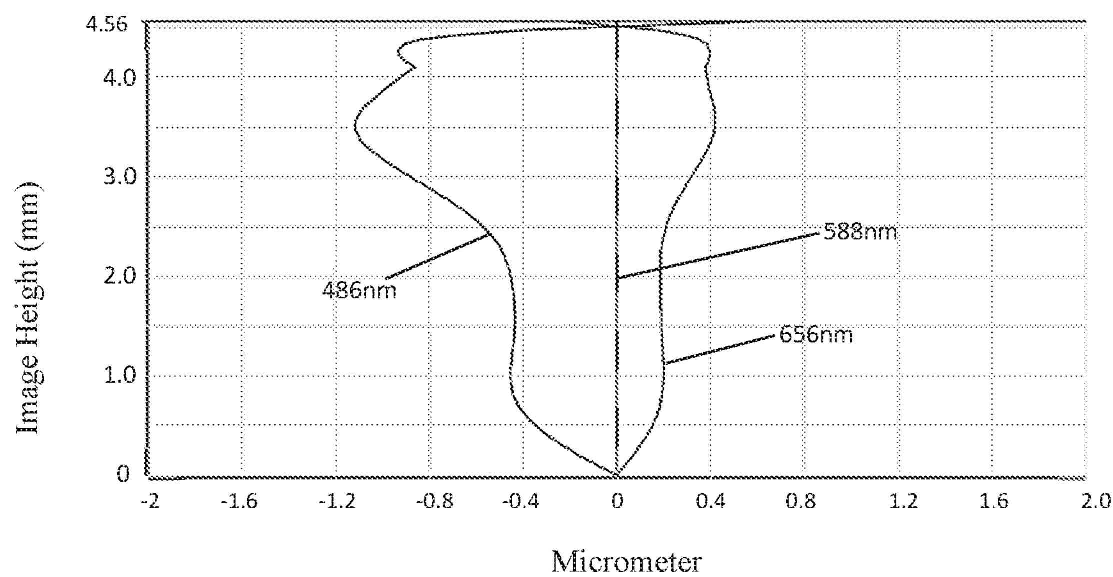
FIG. 3 is a schematic diagram of a lateral color of the wide-angle lens shown in FIG. 1.
Figure 4:
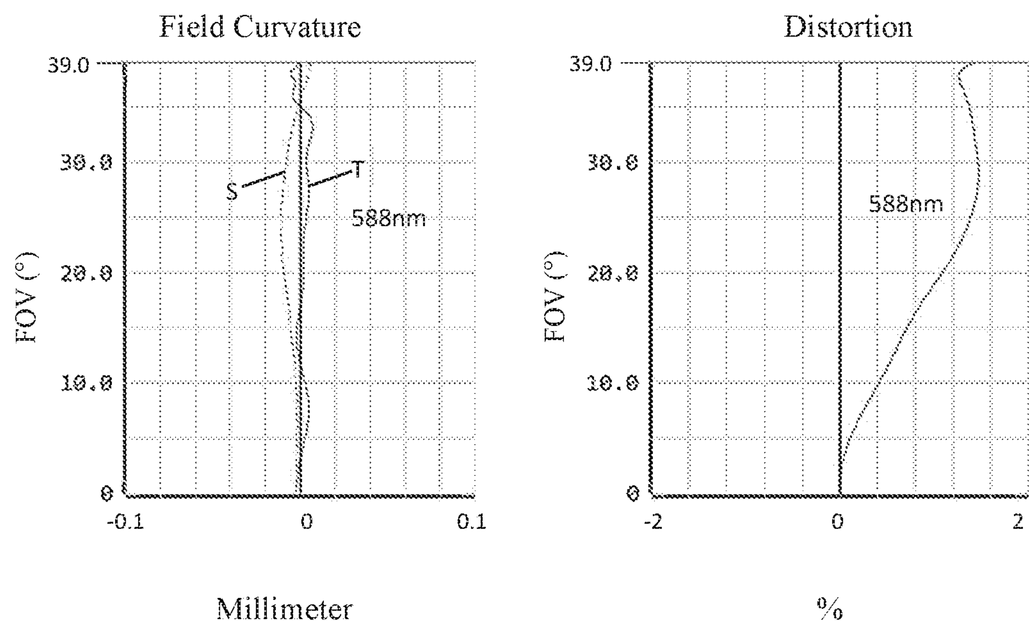
FIG. 4 is a schematic diagram of a field curvature and a distortion of the wide-angle lens shown in FIG. 1.
Figure 5:
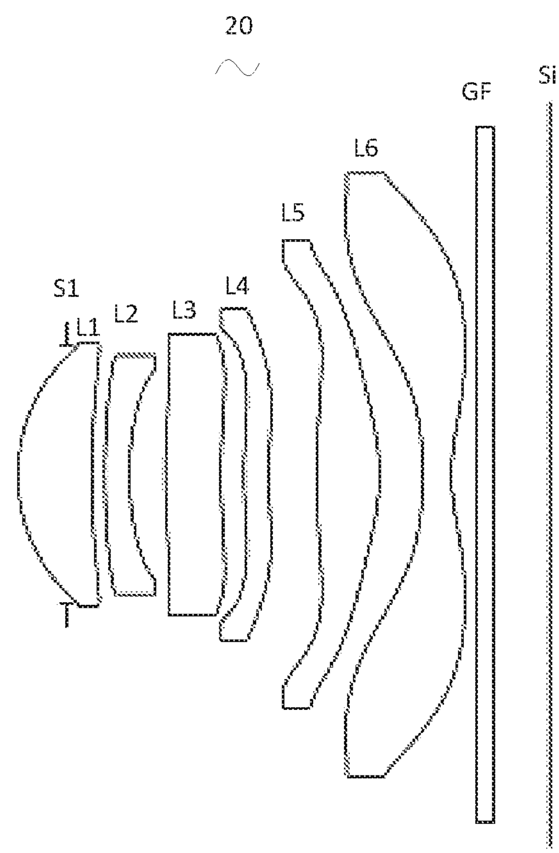
FIG. 5 is a schematic diagram of a structure of a wide-angle lens in accordance with Embodiment 2 of the present disclosure.

FIG. 2 and FIG. 3 illustrate a longitudinal aberration and a lateral color of light with wavelengths of 486 nm, 588 nm, and 656 nm after passing the wide-angle lens 10 according to Embodiment 1, respectively. FIG. 4 illustrates a field curvature and a distortion of light with a wavelength of 588 nm after passing the wide-angle lens 10 according to Embodiment 1, in which a field curvature S is a field curvature in a sagittal direction and T is a field curvature in a tangential direction.

Table 7 which is shown later shows various values of Embodiments 1, 2 and 3 and values corresponding to parameters which are specified in the above conditions.

As shown in Table 7, Embodiment 1 satisfies the above conditions.

In this embodiment, the entrance pupil diameter ENPD of the wide-angle lens is 3.114 mm. The image height of 1.0H is 4.560 mm. The FOV 2ω is 78.048° in a diagonal direction. Thus, the wide-angle lens has a wide-angle and is ultra-thin. Its on-axis and off-axis chromatic aberrations are fully corrected, thereby achieving excellent optical characteristics.

Embodiment 2

Embodiment 2 is basically the same as Embodiment 1 and involves symbols having the same meanings as Embodiment 1, and only differences therebetween will be described in the following.

Table 3 and Table 4 show design data of a wide-angle lens 20 in Embodiment 2 of the present disclosure.

TABLE 3

| | R | d | | nd | | νd | |
|---|---|---|---|---|---|---|---|
| S1 | ∞ | d0 = | −0.600 | | | | |
| R1 | 2.081 | d1 = | 0.900 | nd1 | 1.5439 | ν1 | 55.95 |
| R2 | 8.603 | d2 = | 0.162 | | | | |
| R3 | 7.565 | d3 = | 0.300 | nd2 | 1.6713 | ν2 | 19.24 |
| R4 | 3.422 | d4 = | 0.439 | | | | |
| R5 | 7.849 | d5 = | 0.683 | nd3 | 1.5835 | ν3 | 28.00 |
| R6 | 7.007 | d6 = | 0.283 | | | | |
| R7 | 4.707 | d7 = | 0.303 | nd4 | 1.6150 | ν4 | 25.92 |
| R8 | 5.297 | d8 = | 0.588 | | | | |
| R9 | 11.866 | d9 = | 0.766 | nd5 | 1.5439 | ν5 | 55.95 |
| R10 | −2.417 | d10 = | 0.528 | | | | |
| R11 | −5.436 | d11 = | 0.350 | nd6 | 1.5352 | ν6 | 56.12 |
| R12 | 2.215 | d12 = | 0.300 | | | | |
| R13 | ∞ | d13 = | 0.210 | ndg | 1.5168 | νg | 64.17 |
| R14 | ∞ | d14 = | 0.690 | | | | |

Table 4 shows aspherical surface data of each lens in the wide-angle lens 20 in Embodiment 2 of the present disclosure.

TABLE 4

| | conic coefficient | Aspherical surface coefficients | | | | |
|---|---|---|---|---|---|---|
| | k | A4 | A6 | A8 | A10 | A12 |
| R1 | 4.2713E−02 | −5.5230E−04 | 4.1846E−03 | −8.1689E−03 | 9.3553E−03 | −5.8116E−03 |
| R2 | 2.0176E+00 | −1.9652E−02 | 1.5413E−02 | −8.1151E−03 | 2.9954E−03 | −9.2552E−04 |
| R3 | 3.3834E+00 | −4.5379E−02 | 4.4516E−02 | −2.5033E−02 | 1.1097E−02 | −3.6126E−03 |
| R4 | 3.1891E+00 | −3.3888E−02 | 2.8843E−02 | 7.9144E−03 | −3.1679E−02 | 3.1321E−02 |
| R5 | 9.8884E+00 | −2.5719E−02 | 1.6818E−03 | 5.7673E−04 | −7.5239E−03 | 8.4359E−03 |
| R6 | 7.1851E−02 | −3.9139E−02 | 2.6837E−02 | −2.1831E−02 | 9.0512E−03 | −1.9386E−03 |
| R7 | −7.5159E+00 | −8.9429E−02 | 3.0042E−02 | −2.3936E−04 | −9.5902E−03 | 5.9891E−03 |
| R8 | −5.5311E+01 | −4.5840E−02 | −1.3084E−02 | 2.1208E−02 | −1.3190E−02 | 4.7093E−03 |
| R9 | −7.3729E+01 | 1.3530E−02 | −9.8932E−03 | 5.2625E−04 | 1.1264E−03 | −8.2778E−04 |
| R10 | −8.6356E+00 | 1.7309E−02 | −1.0087E−02 | 6.4990E−03 | −3.4125E−03 | 1.0547E−03 |
| R11 | −1.4917E+00 | −5.4405E−02 | 1.3547E−02 | −9.7108E−04 | −7.6644E−05 | 2.3041E−05 |
| R12 | −1.0683E+01 | −4.9714E−02 | 1.6446E−02 | −4.0287E−03 | 6.8176E−04 | −7.6647E−05 |

| | Aspherical surface coefficients | | | |
|---|---|---|---|---|
| | A14 | A16 | A18 | A20 |
| R1 | 1.8704E−03 | −2.4748E−04 | 0.0000E+00 | 0.0000E+00 |
| R2 | 2.5484E−04 | −5.1008E−05 | 0.0000E+00 | 0.0000E+00 |
| R3 | 7.8076E−04 | −8.4404E−05 | 0.0000E+00 | 0.0000E+00 |
| R4 | −1.4293E−02 | 2.7664E−03 | 0.0000E+00 | 0.0000E+00 |
| R5 | −4.1354E−03 | 8.0641E−04 | 0.0000E+00 | 0.0000E+00 |
| R6 | −5.4257E−06 | 5.1609E−05 | 0.0000E+00 | 0.0000E+00 |
| R7 | −1.6756E−03 | 1.7709E−04 | 0.0000E+00 | 0.0000E+00 |
| R8 | −8.6362E−04 | 6.1954E−05 | 0.0000E+00 | 0.0000E+00 |
| R9 | 2.9887E−04 | −5.8410E−05 | 5.8447E−06 | −2.3352E−07 |
| R10 | −1.8911E−04 | 1.9208E−05 | −1.0045E−06 | 2.0355E−08 |
| R11 | −2.3478E−06 | 1.2796E−07 | −3.4678E−09 | 3.1653E−11 |
| R12 | 5.1549E−06 | −1.6358E−07 | 2.4275E−11 | 8.8283E−11 |

Figure 6:
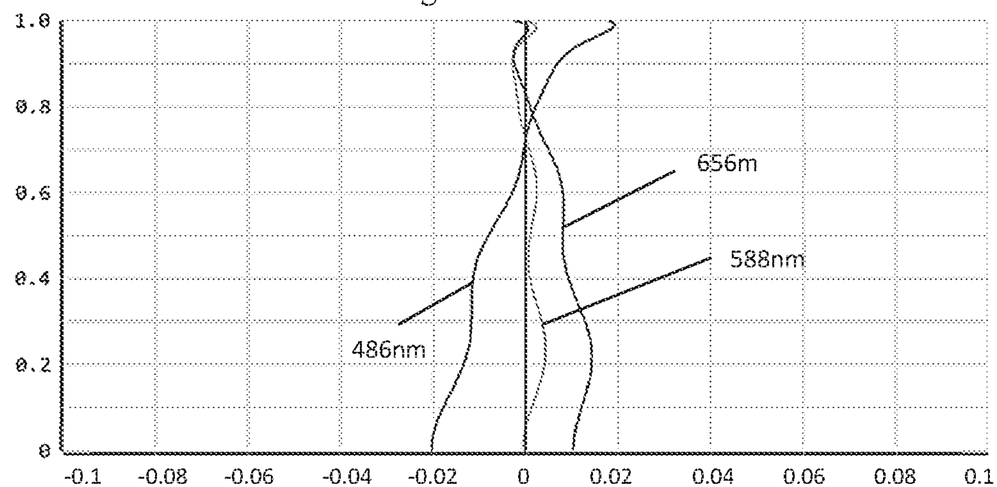
FIG. 6 is a schematic diagram of a longitudinal aberration of the wide-angle lens shown in FIG. 5.
Figure 7:
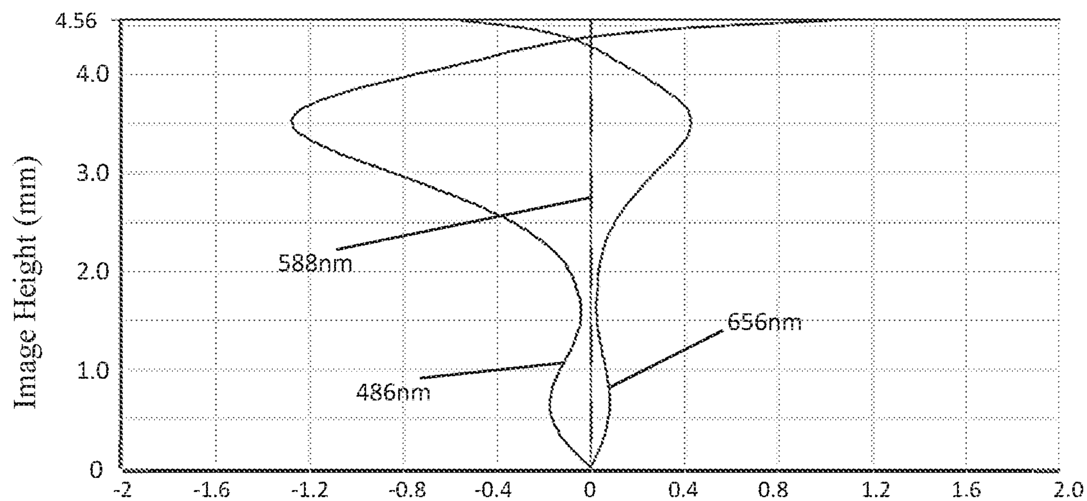
FIG. 7 is a schematic diagram of a lateral color of the wide-angle lens shown in FIG. 5.
Figure 8:
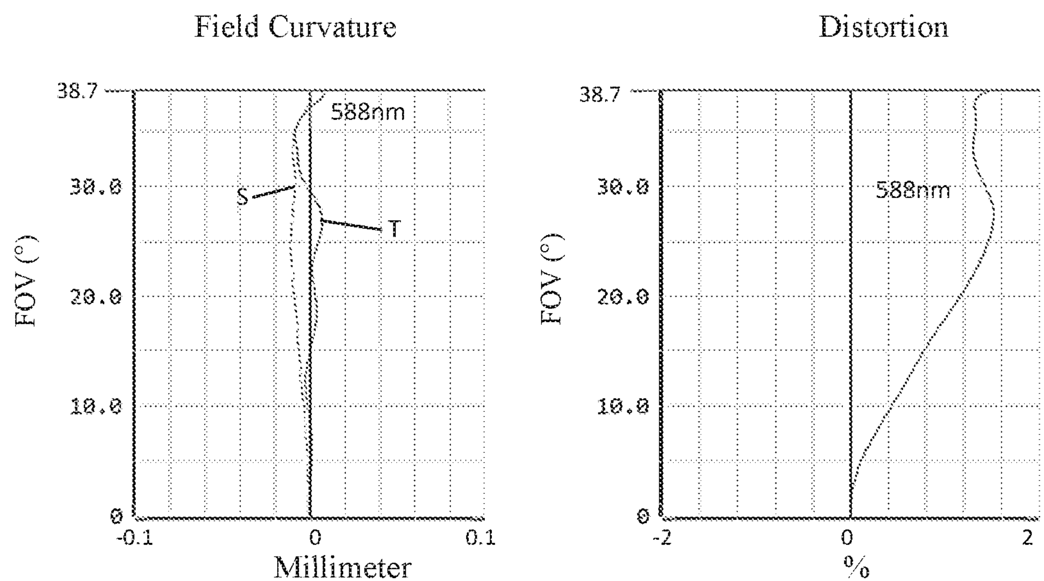
FIG. 8 is a schematic diagram of a field curvature and a distortion of the wide-angle lens shown in FIG. 5.
Figure 9:
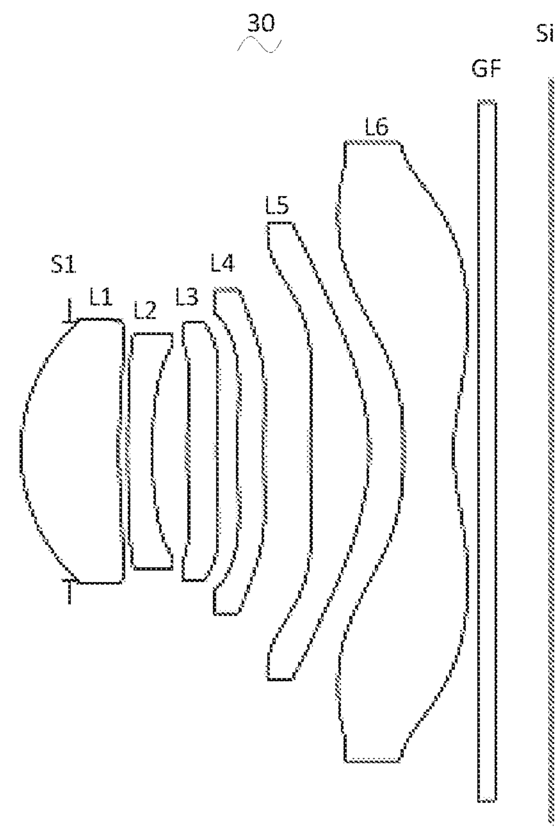
FIG. 9 is a schematic diagram of a structure of a wide-angle lens in accordance with Embodiment 3 of the present disclosure.

FIG. 6 and FIG. 7 illustrate a longitudinal aberration and a lateral color of light with wavelengths of 486 nm, 588 nm, and 656 nm after passing the wide-angle lens 20 according to Embodiment 2, respectively. FIG. 8 illustrates a field curvature and a distortion of light with a wavelength of 588 nm after passing the wide-angle lens 20 according to Embodiment 2.

As shown in Table 7, Embodiment 2 satisfies the above conditions.

In this embodiment, the focal length f1 of the first lens L1 is 4.813 mm, the focal length f2 of the second lens L2 is −9.585 mm, the focal length f3 of the third lens L3 is −159.751 mm, and the focal length f4 of the fourth lens L4 is 57.481 mm, the focal length f5 of the fifth lens L5 is 3.762 mm, the focal length f6 of the sixth lens L6 is −2.894 mm, and the perpendicular distance Yc62 from the arrest point on the image side surface of the sixth lens L6 to the optic axis is 1.545 mm.

The focal length of the wide-angle lens 10 is 5.607 mm, the total optical length TTL is 6.500 mm, the back focal length LB is 1.200 mm, and the FNO is 1.763. The entrance pupil diameter ENPD of the wide-angle lens is 3.180 mm. The image height of 1.0H is 4.560 mm. The FOV 2ω is 77.40° in a diagonal direction. Thus, the wide-angle lens has a wide-angle and is ultra-thin. Its on-axis and off-axis chromatic aberrations are fully corrected, thereby achieving excellent optical characteristics

Embodiment 3

Embodiment 3 is basically the same as Embodiment 1 and involves symbols having the same meanings as Embodiment 1, and only differences therebetween will be described in the following.

Table 5 and Table 6 show design data of a wide-angle lens 30 in Embodiment 3 of the present disclosure.

TABLE 5

| | R | d | | nd | | νd | |
|---|---|---|---|---|---|---|---|
| S1 | ∞ | d0 = | −0.600 | | | | |
| R1 | 2.128 | d1 = | 1.200 | nd1 | 1.5439 | ν1 | 55.95 |
| R2 | 8.209 | d2 = | 0.107 | | | | |
| R3 | 11.203 | d3 = | 0.300 | nd2 | 1.6713 | ν2 | 19.24 |
| R4 | 4.684 | d4 = | 0.432 | | | | |
| R5 | 8.668 | d5 = | 0.355 | nd3 | 1.5835 | ν3 | 28.00 |
| R6 | 7.004 | d6 = | 0.257 | | | | |
| R7 | 6.342 | d7 = | 0.324 | nd4 | 1.6150 | ν4 | 25.92 |
| R8 | 8.379 | d8 = | 0.568 | | | | |
| R9 | 25.576 | d9 = | 0.728 | nd5 | 1.5439 | ν5 | 55.95 |
| R10 | −2.471 | d10 = | 0.418 | | | | |
| R11 | −5.717 | d11 = | 0.612 | nd6 | 1.5352 | ν6 | 56.12 |
| R12 | 2.299 | d12 = | 0.300 | | | | |
| R13 | ∞ | d13 = | 0.210 | ndg | 1.5168 | νg | 64.17 |
| R14 | ∞ | d14 = | 0.688 | | | | |

Table 6 shows aspherical surface data of each lens in the wide-angle lens 30 in Embodiment 3 of the present disclosure.

TABLE 6

| | conic coefficient | Aspherical surface coefficients | | | | |
|---|---|---|---|---|---|---|
| | k | A4 | A6 | A8 | A10 | A12 |
| R1 | 2.4693E−02 | −1.6208E−03 | 3.9839E−03 | −7.6458E−03 | 7.7309E−03 | −4.3210E−03 |
| R2 | −4.1685E+00 | −3.6865E−02 | 2.5932E−02 | −1.6320E−02 | 1.2705E−02 | −8.9581E−03 |
| R3 | −8.1196E+00 | −5.6288E−02 | 6.2118E−02 | −4.1246E−02 | 2.8351E−02 | −1.6914E−02 |
| R4 | 9.8025E−01 | −2.4457E−02 | 3.7251E−02 | 7.4330E−03 | −3.8331E−02 | 3.8776E−02 |
| R5 | 7.7438E+00 | −5.1787E−02 | 3.1582E−02 | −5.1680E−02 | 4.8985E−02 | −2.9921E−02 |
| R6 | 5.6495E+00 | −6.7731E−02 | 4.4276E−02 | −4.0894E−02 | 2.0404E−02 | −5.8395E−03 |
| R7 | −1.5765E+00 | −9.4143E−02 | 4.2193E−02 | −2.9195E−02 | 1.8094E−02 | −7.5547E−03 |
| R8 | −1.2148E+01 | −7.8195E−02 | 2.1956E−02 | −1.1687E−02 | 6.1908E−03 | −1.6670E−03 |
| R9 | 1.1702E+01 | 4.6486E−03 | −2.0158E−02 | 9.2864E−03 | −3.5527E−03 | 9.6254E−04 |
| R10 | −3.9231E+00 | 3.3220E−02 | −3.2667E−02 | 1.6943E−02 | −5.4602E−03 | 1.1053E−03 |
| R11 | −5.6369E−02 | −7.2250E−02 | 2.3177E−02 | −2.9581E−03 | 2.0710E−04 | −1.6332E−05 |
| R12 | −9.7952E+00 | −5.4268E−02 | 2.0451E−02 | −5.4821E−03 | 1.0093E−03 | −1.2925E−04 |

| | Aspherical surface coefficients | | | |
|---|---|---|---|---|
| | A14 | A16 | A18 | A20 |
| R1 | 1.2472E−03 | −1.5108E−04 | 0.0000E+00 | 0.0000E+00 |
| R2 | 3.3698E−03 | −4.9665E−04 | 0.0000E+00 | 0.0000E+00 |
| R3 | 5.9709E−03 | −8.4320E−04 | 0.0000E+00 | 0.0000E+00 |
| R4 | −1.8150E−02 | 3.5172E−03 | 0.0000E+00 | 0.0000E+00 |
| R5 | 1.0033E−02 | −1.4467E−03 | 0.0000E+00 | 0.0000E+00 |
| R6 | 5.3120E−04 | 5.8338E−05 | 0.0000E+00 | 0.0000E+00 |
| R7 | 1.6524E−03 | −1.4813E−04 | 0.0000E+00 | 0.0000E+00 |
| R8 | 2.1480E−04 | −1.0856E−05 | 0.0000E+00 | 0.0000E+00 |
| R9 | −1.6608E−04 | 1.8301E−05 | −1.2073E−06 | 3.6066E−08 |
| R10 | −1.3436E−04 | 8.8902E−06 | −2.4874E−07 | 3.9480E−10 |
| R11 | 2.3449E−06 | −2.3393E−07 | 1.1630E−08 | −2.2755E−10 |
| R12 | 1.1282E−05 | −6.3920E−07 | 2.1190E−08 | −3.1100E−10 |

Figure 10:
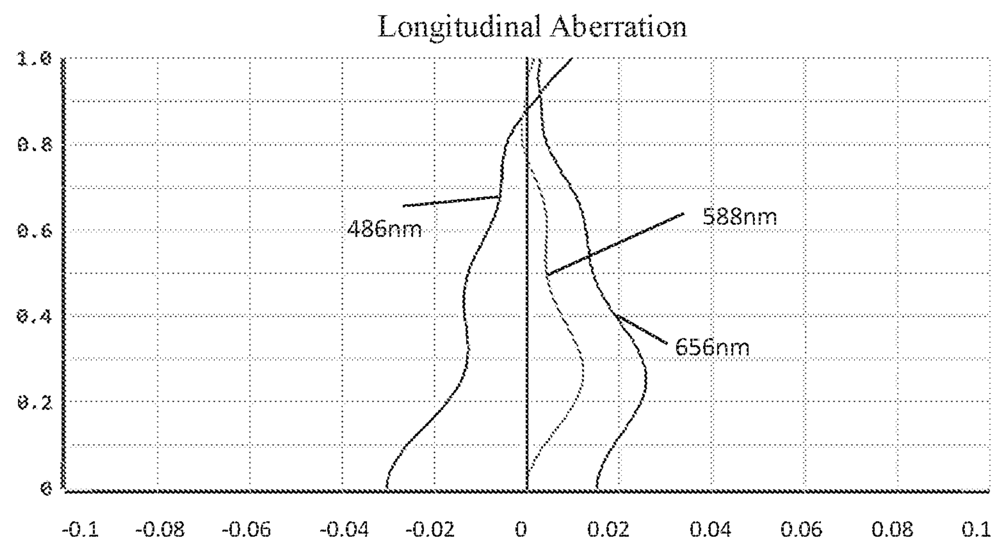
FIG. 10 is a schematic diagram of a longitudinal aberration of the wide-angle lens shown in FIG. 9.
Figure 11:
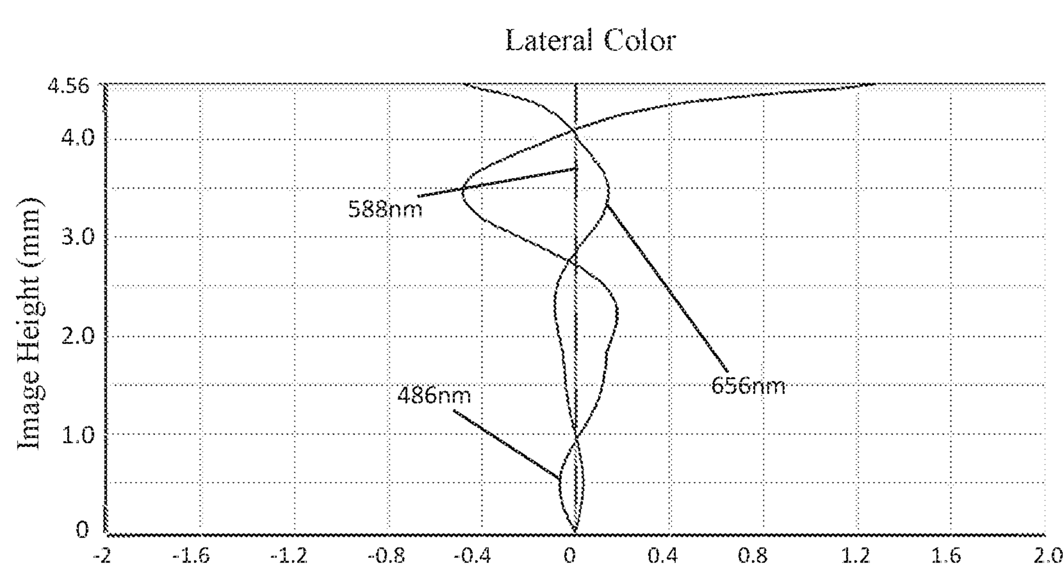
FIG. 11 is a schematic diagram of a lateral color of the wide-angle lens shown in FIG. 9.
Figure 12:
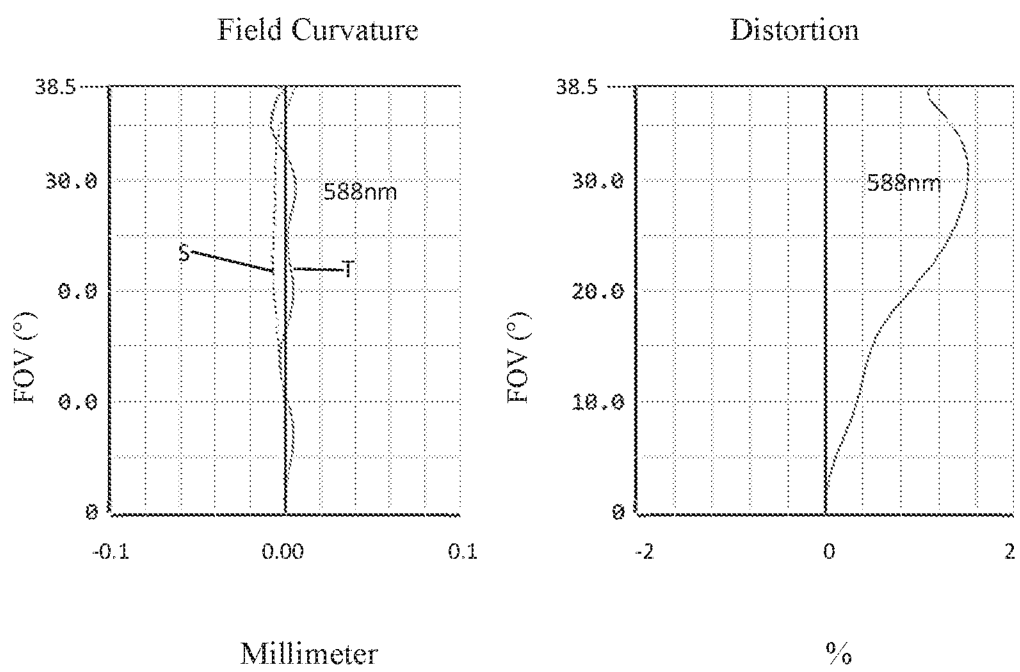
FIG. 12 is a schematic diagram of a field curvature and a distortion of the wide-angle lens shown in FIG. 9.

FIG. 10 and FIG. 11 illustrate a longitudinal aberration and a lateral color of light with wavelengths of 486 nm, 588 nm, and 656 nm after passing the wide-angle lens 30 according to Embodiment 3 respectively. FIG. 12 illustrates a field curvature and a distortion of light with a wavelength of 587.6 nm after passing the wide-angle lens 30 according to Embodiment 3.

Table 7 in the following lists values corresponding to the respective conditions in this embodiment. It is apparent that the imaging optical system of the present embodiment satisfies the above conditional expression.

In this embodiment, the focal length f1 of the first lens L1 is 4.939 mm, the focal length f2 of the second lens L2 is −12.216 mm, the focal length f3 of the third lens L3 is −67.867 mm, and the focal length f4 of the fourth lens L4 is 40.013 mm, the focal length f5 of the fifth lens L5 is 4.182 mm, the focal length f6 of the sixth lens L6 is −2.984 mm, and the perpendicular distance Yc62 from the arrest point on the image side surface of the sixth lens L6 to the optic axis is 1.615 mm.

In this embodiment, the focal length of the wide-angle lens 10 is 5.664 mm, the total optical length TTL is 6.498 mm, the back focal length LB is 1. 198 mm, and the FNO is 1.780. The entrance pupil diameter ENPD of the wide-angle lens is 3.182 mm. The image height of 1.0H is 4.56 mm. The FOV 2ω is 77.047° in a diagonal direction. Thus, the wide-angle lens has a wide-angle and is ultra-thin and its on-axis and off-axis chromatic aberrations are fully corrected, thereby achieving excellent optical characteristics.

Table 7 shows various values of Embodiments 1, 2 and 3 and values corresponding to parameters which are specified in the above conditions.

TABLE 7

| Conditions | Embodiment 1 | Embodiment 2 | Embodiment 3 |
|---|---|---|---|
| R5/d5 | 29.51 | 11.49 | 24.42 |
| R9/d9 | 47.20 | 15.49 | 35.13 |
| (R1 + R2)/(R1 − R2) | −1.08 | −1.64 | −1.70 |
| D1/d3 | 2.80 | 3.00 | 4.00 |

It can be appreciated by one having ordinary skill in the art that the description above is only embodiments of the present disclosure. In practice, one having ordinary skill in the art can make various modifications to these embodiments in forms and details without departing from the spirit and scope of the present disclosure.

What is claimed is:

1. A wide-angle lens, comprising, from an object side to an image side:

a first lens having a positive refractive power;

a second lens having a negative refractive power;

a third lens having a negative refractive power;

a fourth lens;

a fifth lens; and a sixth lens, wherein the wide-angle lens satisfies following conditions:

$$0.05 \leq f2/f3 \leq 0.20;$$

$$10.00 \leq R5/d5 \leq 30.00;$$

$$15.00 \leq R9/d9 \leq 50.00;$$

$$-20.00 \leq (R1+R2)/(R1-R2) \leq -1.00; \text{ and}$$

$$2.75 \leq d1/d3 \leq 5.00,$$

Where f2 denotes a focal length of the second lens;

f3 denotes a focal length of the third lens;

R1 denotes an on-axis curvature radius of an object side surface of the first lens;

R2 denotes an on-axis curvature radius of an image side surface of the first lens;

R5 denotes an on-axis curvature radius of an object side surface of the third lens;

R9 denotes an on-axis curvature radius of an object side surface of the fifth lens;

d1 denotes an on-axis thickness of the first lens;

d3 denotes an on-axis thickness of the second lens;

d5 denotes an on-axis thickness of the third lens; and d9 denotes an on-axis thickness of the fifth lens.

2. The wide-angle lens as described in claim 1, further satisfying a following condition:

$$0.50 \leq f1/f \leq 2.00,$$

where f denotes a focal length of the wide-angle lens;

f1 denotes a focal length of the first lens.

3. The wide-angle lens as described in claim 2, further satisfying a following condition:

$$0.50 \leq f1/f \leq 1.00,$$

4. The wide-angle lens as described in claim 2, further satisfying a following condition:

$$0.10 \leq Yc62/TTL \leq 0.55,$$

where

Yc62 denotes a perpendicular distance from an arrest point on an image side surface of the sixth lens to an optic axis; and TTL denotes a total optical length from an object side surface of the first lens to an image plane of the wide-angle lens along the optic axis.

5. The wide-angle lens as described in claim 1, further satisfying a following condition:

$$1.00 \leq (R3+R4)/(R3-R4) \leq 5.00,$$

where

R3 denotes an on-axis curvature radius of an object side surface of the second lens; and R4 denotes an on-axis curvature radius of an image side surface of the second lens.

6. The wide-angle lens as described in claim 5, further satisfying a following condition:

$$1.00 \leq (R3+R4)/(R3-R4) \leq 3.00.$$

7. The wide-angle lens as described in claim 1, wherein the fourth lens has a positive refractive power, the fifth lens has a positive refractive power, and the sixth lens has a negative refractive power.

8. The wide-angle lens as described in claim 1, wherein an F number of the wide-angle lens is smaller than or equal to 2.00.

* * * * *